INVENTORS
TAKEO MIURA
CHIKAFUSA HIRANO
H. Edward Mueller

INVENTORS
TAKEO MIURA
CHIKAFUSA HIRANO 3,437,800

SYNCHRONOUS AND ASYCHRONOUS CONTROL FOR HYBRID COMPUTER

Takeo Miura, Kokubunji-shi, Tokyo-to, and Chikafusa Hirano, Kodaira-shi, Tokyo-to, Japan, assignors to Kabushiki Kaisha Hitachi Seisakusho, Tokyo-to, Japan, a joint-stock company of Japan Continuation-in-part of application Ser. No. 346,448, Feb. 21, 1964. This application Jan. 23, 1968, Ser. No. 699,883

Int. Cl. G06j *1/00*

U.S. Cl. 235—150.5 1 Claim

ABSTRACT OF THE DISCLOSURE

A hybrid computer of the type that is provided with an analog computer, a digital computer and conversion means between the analog and digital computers, has a synchronous pulse generator, an AND-gate circuit, three interconnected switching means, means for applying the logical product and a completion signal to the respective switching means, and means for producing a hold signal, whereby shifting may be accomplished among the computation systems and control methods of the analog and digital computers.

This is a continuation-in-part application of our copending application Ser. No. 346,448, now abandoned, filed Feb. 21, 1964, entitled, "Hybrid Computer."

This invention relates to a hybrid computer of the type, wherein an analog computer and a digital computer are combined each other through an analog-to-digital conversion device and a digital-to-analog conversion device. More specifically, it relates to an improved hybrid computer which can be caused to switch freely from one computation system and control method to the others in accordance with problems to be solved by computation and the respective advantageous feature of the two computers.

In general, in respect of computation time to be assigned to both an analog computer and a digital computer, there has heretofore been adopted either a serial computation system or a parallel computation system. In the hybrid computer adopting the serial computation system, the analog and digital computers perform serial computation alternately, and, in the parallel computation system hybrid computer, the analog computer is constantly held in an operational state, while the digital computer carries out computation in an intermitent and periodical manner.

Furthermore, in either computation system to be employed, there has been adopted two control methods on the computation system, i.e., either the synchronous control method or the asynchronous control method. According to the scynchronous control method, the commencement of each computation cycle is controlled in response to synchronous pulses supplied from any appropriate external means, while, according to the asynhronous control method, the same computation cycle only repeats in succession between the analog and digital computers.

It is therefore now considered that there are two computation systems and two control methods, from which four kinds of combination can be contemplated. The conventional hybrid computer has only been constructed by any one of these combinations.

It is therefore an object of the present invention to provide a hybrid computer which is capable of carrying out a desired computation by switching freely from one computation system and one control method to the others so as to efficiently solve various kinds of computation problems.

The above object and other objects and advantages have been achieved by the present invention, the nature, principle and details of which will become more apparent by reference to the following description taken in conjunction with the accompanying drawing, in which:

FIGURE 1 is a block diagram showing a construction of a conventional hybrid computer;

FIGURES 2*a* and 2*b* are diagrams for explaining the operations of serial computation system and parallel computation system, respectively;

Figure 1:
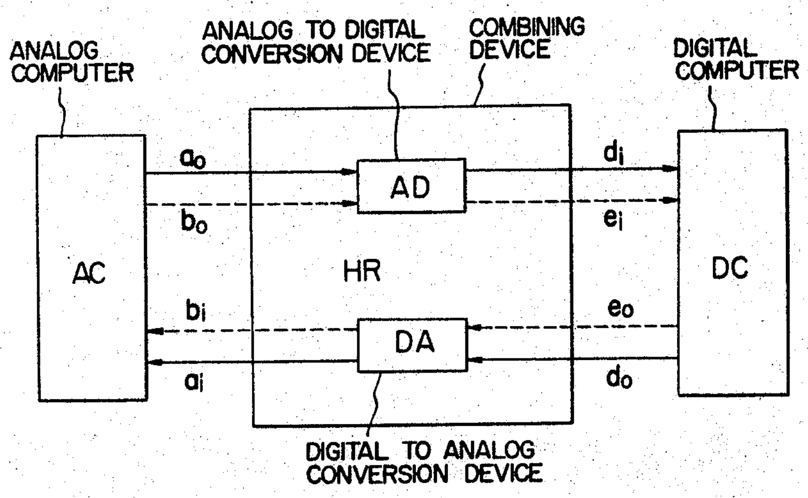

FIGURE 1 is a conventional hybrid computer based on combination of the serial computation system and the asynchronous control method. In the drawing, an analog computer AC and a digital computer DC are combined through a converting and combining device HR including an analog-to-digital conversion device AD for converting the computation result $a_0$ (analog signal) of the analog computer AC into a digital signal $d_i$ and supplying it to the digital computer DC, and a digital-to-analog conversion device DA for converting the computation result $d_0$ (digital signal) of the digital computer DC into an analog signal $a_i$ and supplying it to the analog computer AC. In this case, the analog computer AC ceases its operations after lapse of a certain definite operating time $T_1$ shown in FIGURE 2 to send out a signal $b_0$ indicating completion of computation of the analog computer AC to the digital conversion device AD. The conventional hybrid computer apparently possessed the function of emitting such signal $b_0$; see, for example, pages 475 to 476 of "Electronic Analog and Hybrid Computers" by Korn and Korn, published from McGraw Hill Book Company, 1964, in which "timing" signal produced by analog computer shown in FIGS. 11–21 actually corresponds to the signal $b_0$.

The analog to digital conversion device AD caused to operate in response to the signal $b_0$ and as soon as the conversion operation thereof is completed, it produces a signal $e_i$ indicating completion of the conversion operation. Such function of the digital conversion device AD is also known. For example, the term "conversion completed" is indicated in FIGS. 11–21 of the above reference book, the indication of which means that a signal corresponding to $e_i$ is used in a conventional hybrid computer as shown in FIGS. 11–21 of the reference.

The digital computer DC starts its computation operation in response to the signal $e_i$ and a converted digital signal $d_i$ is applied thereto. As soon as the computation operation of the computer DC is completed, it produces a signal $e_0$ which indicates the completion. From the aforementioned reference book, it is also known already that the digital computer has such function. For example, "timing" signal produced from the general purpose digital computer shown in FIGS. 11–21 of the reference corresponds to the signal $e_0$.

The digital-to-analog conversion device DA is caused to operate in response to the signal $e_0$ and after completion of this conversion operation, the converted analog signal $a_i$ is applied to the analog computer AC which is caused to start its computation operation in response to a signal $b_i$ which indicates completion of conversion operation of the device DA. In FIGS. 11–21 of the aforementioned reference, there is shown, for example, a "timing" signal supplied from "linkage control unit to *D/A* converters." This timing signal exactly corresponds to the signal $b_i$, hence it is apparent that the digital-to-analog conversion device has the function of emitting the signal $b_i$ in the first place. In this case, if and when the abovementioned synchronous control method is adopted, it is necessary to construct the computer wherein the analog computer AC synchronizes with a signal supplied from any switchable external means so as to control its computation operation.

Figure 2A:
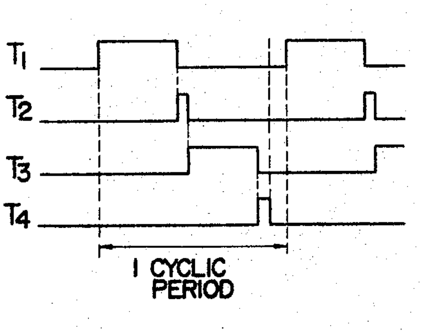
Figure 2B:
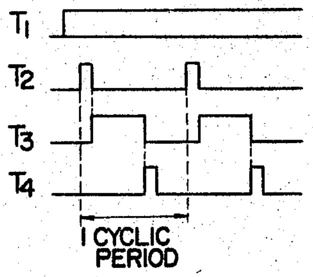

On the other hand, according to the parallel computation system, as shown in FIG. 2*b*, the analog computer AC is maintained to be always in an operational state and the other means operate as aforedescribed.

In FIGS 2*a* and 2*b* which shows respectively assignments of the computation time of the serial computation system and the parallel computation system, $T_1$ indicates the operating time of an analog computer, $T_2$ is operating time of an analog-to-digital conversion device, $T_3$ is operating time of a digital computer, and $T_4$ denotes operating time of a digital-to-analog conversion device.

In general, it is highly desirable to increase the function of the hybrid computer and to expand its applicable range. However, as stated in the foregoing, the constructions of the conventional hybrid computers are limited only to either the serial computation system or the parallel computation system as well as either the synchronous control method or the asynchronous control method. Under the circumstances, various kinds of computation problems cannot be efficiently solved by such hybrid computers because its capability of carrying out desired computation is limited to only one computation system and one control method.

The hybrid computer of the present invention, in order to achieve the primary purpose of carrying out desired computation by freely switching from one computation system and one control method to the others, provides the undermentioned various components.

(1) An analog computer having means for producing a first completion signal which indicates completion of the computation;

(2) A digital computer having means for producing a second completion signal which indicates completion of the computation;

(3) An analog-to-digital conversion device inserted between both computers for converting an output analog computation result of the analog computer into an input digital signal of the digital computer and producing a third completion signal which indicates completion of the required analog-to-digital conversion;

(4) A digital-to-analog conversion device inserted between both computers to convert an output digital computation result of the digital computer into an input analog signal of the analog computer, and providing a fourth completion signal which indicates completion of the required digital-to-analog conversion;

(5) A synchronous pulse generator;

(6) An AND-gate circuit to which a synchronous pulse produced by the generator and the fourth completion signal is applied so as to produce a logical product thereof.

(7) First, second, and third switching means, each having first, second, and third terminals for changing over the connection between the third terminal and any one of the first and second terminals thereof;

(8) Means for applying the logical product and the fourth completion signal to the respective first and second terminals of the first switching means; and (9) Means for producing a hold signal.

In the above switching means, the third terminal of the second switching means is connected to the analog computer so as to cause it to operate in response to the hold signal or the fourth completion signal or the logical product. The first terminals of the second and third switching means are connected to the third terminal of the first switching means. The second terminal of the second switching is connected to the hold signal producing means so as to cause the analog computer to be held in an operational state while the hold signal is being applied thereto. The second terminal of the third switching means is connected to the analog computer so as to cause the analog-to-digital conversion device to operate in response to the first completion signal. The third terminal of the third switching means is connected to the analog-to-digital conversion device.

The present invention will be explained in more detail with reference to a preferred example shown in FIG. 3.

Figure 3:
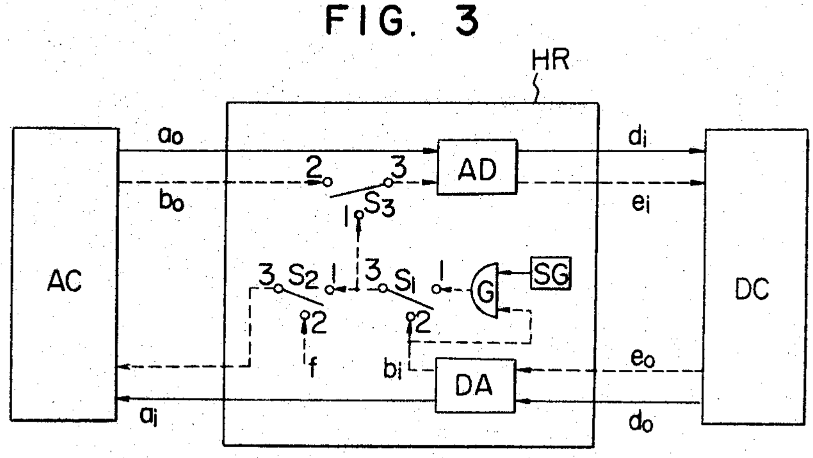
FIGURE 3 is a block diagram showing a construction of one example of the present invention.

In FIG. 3 the converting and combining device further provided with change-over switches $S_1$ and $S_2$ to switch from the serial computation system to the parallel computation system or vice versa, a change-over switch $S_3$ to switch from the synchronous control method to the asynchronous control method or vice versa, and AND-gate circuit G, a synchronous pulse generator SG and means for producing a hold signal *f*.

Digital-to-analog conversion device DA usually available on the market has the function of either producing the fourth completion signal $b_i$ as mentioned above, or not producing the same. In case, therefore, it has no function of producing the fourth completion signal, it is necessary to add to the device DA a circuit of a construction as shown in FIG. 4, for example.

Figure 4:
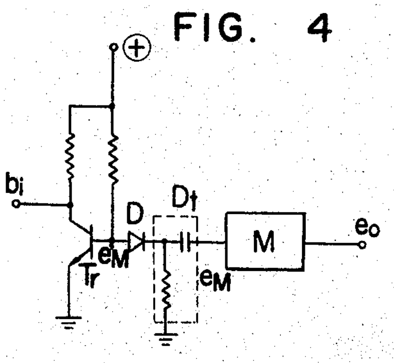
FIGURE 4 is a circuit diagram to be used for examples, etc. of this invention.
Figure 5:
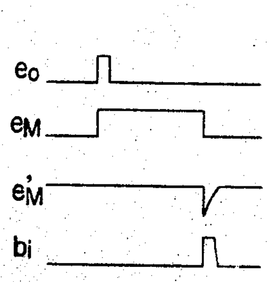
FIGURE 5 is a diagram for explaining the operations of the circuit shown in FIGURE 4.

In FIG. 4, the circuit is composed of a monostable multivibrator M, a differentiation circuit $D_t$, a diode D, a transistor *Tr*. To the monostable multivibrator M is added the aforesaid signal $e_o$. Waveforms at the respective component elements will be as shown in FIG. 5. The construction of the circuit being thus made, it will become possible to produce the abovementioned signal $b_i$ as soon as the conversion operation commenced with arrival of the signal $e_o$ at the digital-to-analog conversion device DA is completed after a certain definite time period. Also, in order that the computation is to be carried out in accordance with the parallel computation system, a signal to hold the analog computer AC in a constant operational state, i.e., hold signal *f*, need be added beforehand to the second terminal 2 of the switch $S_2$. For the purpose of obtaining such hold of signal *f*, an OR gate circuit OR, for instance, as shown in FIG. 6 is used.

Figure 6:
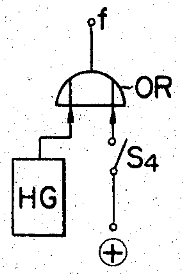
FIGURE 6 is a diagram of a device to be used for the abovementioned examples, etc.

In FIG. 6, a switch $S_4$ to dictate comencement of computation of the analog computer AC is connected to an appropriate power source. Disignated by reference letters HG is a hold generator to generate the hold signal *f* to carry out parallel computation right after the analog computer AC starts its operation.

By the above-described construction and arrangement of the hybrid computer of the invention, selection from the serial and parallel computation systems as well as synchronous and asynchronous control methods can be optionally made in accordance with computation problems to be solved. For example, when the third terminals 3 of the switches $S_1$ and $S_2$ are caused to be in contact with their respective first terminals 1, and the third terminal 3 of the switch $S_3$ is caused to be in contact with its second terminal 2, the analog-to-digital conversion device AD starts its conversion operation in response to the first completion signal $b_o$, and the digital-to-analog conversion device DA sends the fourth completion signal out to the AND gate circuit G to start the operation of the analog computer AC, whereby the serial computation system is established. In this case, however, as the switch $S_1$ is in a state of contact at its first terminal 1, the operation of the analog computer AC is caused to start in response to the logical product of the AND gate circuit G, one input of which being the fourth completion signal $b_i$ and the other being a synchronous pulse C, whereby the synchronous control method becomes employed. If and when the third terminal 3 alone of the switch $S_1$ is placed in contact with its second terminal 2, while the switches $S_2$ and $S_3$ are being maintained in their respective terminal positions as described above, the operations of the analog computer AC will be caused to start in response to the signal $b_1$ alone. In this case, therefore, the asynchronous control method is said to be employed. Also, if the third terminal 3 of the switch $S_2$ is caused to be in contact with its second terminal 2, and the third terminal 3 of the switch $S_3$ is in contact with its first terminal 1, the analog computer AC will be maintained constantly in an operational state due to the hold signal *f*, whereby a loop of DC–DA–AD–DC will be formed. The analog-to-digital conversion device AD is so designed that its conversion operation be commenced with the fourth completion signal $b_1$ or the logical product, the digital computer DC periodically repeating the operation. Thus, in this case, the parallel computation system is established, though it is apparent that the control method can be optionally selected from the synchronous and asynchronous control methods by causing the third terminal 3 of the switch $S_1$ to contact its first terminal 1 or second terminal 2.

Moreover, it is apparent that the switches $S_1$, $S_2$ and $S_3$ may be of either mechanical or electronic type, and their operation may be controlled by means of direct manual control means or an automatic control means from outside. According to the invention, computation problems of various kinds can be carried out by means of the most suitable computation system and control method in each case. It should be understood, of course, that the foregoing disclosure relates to only a preferred embodiment of the invention, and a few modifications thereof, and it is intended to cover all changes and modifications of the examples of the invention herein chosen for the purpose of the disclosure, which do not constitute departures from the spirit and scope of the invention as set forth in the appended claims.

What is claimed is:

1. In a hybrid computer of the type provided with an analog computer having means for producing a first completion signal which indicates completion of the computation thereof; a digital computer having means for producing a second completion signal which indicates completion of the computation thereof; an analog-to-digital conversion device inserted between both analog and digital computers to convert an output analog computation result of the analog computer into an input digital signal of the digital computer and to produce a third completion signal indicating completion of the analog-to-digital conversion operation thereof; and a digital-to-analog conversion device inserted between said both computers to convert an output digital computation result of the digital computer into an input analog signal of the analog computer and producing a fourth completion signal indicating completion of the digital-to-analog conversion operation thereof, thereby to accomplish the desired computation by properly assigning the computation time to said both computers; the improvement which comprises a synchronous pulse generator; and AND-gate circuit, to which a synchronous pulse produced by said generator and the fourth completion signal are applied to produce a logical product thereof; first, second and third switching means, each having first, second and third terminals for switching over connection between the third terminal and any one of the first and second terminals thereof; means for applying the logical product and the fourth completion signal to the first and second terminals of the first switching means, respectively; means for producing a hold signal, the third terminal of said second switching means being connected to the analog computer to cause it to operate in response to the hold signal or the fourth completion signal or the logical product, the first terminals of said second and third switching means being connected to the third terminal of the first switching means, the second terminal of said second switching means being connected to the hold signal producing means to cause the analog computer to be held in an operational state while the hold signal is being applied thereto, the second terminal of said third switching means being connected to the analog computer to cause the analog-to-digital conversion device to operate in response to the first completion signal, and the third terminal of said third switching means being connected to the analog-to-digital conversion device.

References Cited

UNITED STATES PATENTS

| | | | |
|---|---|---|---|
| 3,314,050 | 4/1967 | Debroux et al. | 235—150.5 XR |
| 3,322,942 | 5/1967 | Gerard et al. | 235—150.51 XR |
| 3,034,719 | 5/1962 | Anfenger et al. | 235—154 |
| 3,036,772 | 5/1962 | Pughe | 235—154 |
| 3,221,155 | 11/1965 | Birkel | 35—154 |

OTHER REFERENCES

Greenstein, J.: A Two Channel Data Link for Combined Analog-Digital Simulation, Paper No. 60–10 (1960) pp. 1 to 7, 9, 10 (FIGURES 2 and 3).

Truitt: Parallel-Analog, Sequential-Digital, and True-Hybrid Computers, Data Systems Engineering (pp. 7 to 12) February 1964.

MARTIN P. HARTMAN, *Primary Examiner.*